United States Patent [19]

Groenenboom

[11] Patent Number: 4,791,085
[45] Date of Patent: Dec. 13, 1988

[54] BARIUM TITANIUM OXIDE-CONTAINING FLUIDIZABLE CRACKING CATALYST COMPOSITION

[75] Inventor: Cornelis J. Groenenboom, Driehuis, Netherlands

[73] Assignee: Akzo N.V., Arnhem, Netherlands

[21] Appl. No.: 837,400

[22] Filed: Mar. 7, 1986

[30] Foreign Application Priority Data

Mar. 12, 1985 [NL] Netherlands ...................... 8500689
Oct. 29, 1985 [NL] Netherlands ...................... 8502943

[51] Int. Cl.$^4$ ...................... B01J 29/06; B01J 21/16
[52] U.S. Cl. ...................... 502/68; 502/64; 502/84; 502/521
[58] Field of Search ...................... 502/64, 68, 65, 84, 502/516, 521

[56] References Cited

U.S. PATENT DOCUMENTS

| | | | |
|---|---|---|---|
| 2,730,487 | 1/1956 | Porter et al. | 196/24 |
| 2,862,875 | 12/1958 | Morrell | 208/119 |
| 3,252,757 | 5/1966 | Granquist | 23/111 |
| 3,252,889 | 5/1966 | Capell et al. | 208/120 |
| 3,471,410 | 10/1969 | Oleck et al. | 502/64 |
| 3,472,791 | 10/1969 | Vesely et al. | 252/448 |
| 3,609,103 | 9/1971 | Gladrow et al. | 252/455 Z |
| 3,676,330 | 7/1972 | Plank et al. | 252/455 Z |
| 3,743,594 | 7/1973 | Mulaskey | 208/216 |
| 3,985,639 | 10/1976 | Suggitt et al. | 208/120 |
| 4,107,088 | 8/1978 | Elliott, Jr. | 252/455 Z |
| 4,126,579 | 11/1978 | Flaherty, Jr. et al. | 252/455 Z |
| 4,179,409 | 12/1979 | Gladrow et al. | 208/120 |
| 4,182,693 | 1/1980 | Gladrow | 252/455 Z |
| 4,243,514 | 1/1981 | Bartholic | 208/91 |
| 4,263,128 | 4/1981 | Bartholic | 208/91 |
| 4,432,890 | 2/1984 | Beck et al. | 502/62 |
| 4,451,355 | 5/1984 | Mitchell et al. | 208/113 |
| 4,473,463 | 9/1984 | Bertus et al. | 208/120 |
| 4,496,665 | 1/1985 | Hettinger, Jr. et al. | 502/521 |

FOREIGN PATENT DOCUMENTS

| | | |
|---|---|---|
| 0063712 | 3/1982 | European Pat. Off. . |
| 3518094 | 11/1985 | Fed. Rep. of Germany ........ 502/64 |
| 8203226 | 9/1982 | World Int. Prop. O. . |

OTHER PUBLICATIONS

"Phase Equilibria in the System $BaO-TiO_2$", by D. E. Rase & Rustum Roy, Journal of the American Ceramic Society, vo. 38, No. 3, pp. 102–113.
"The Ternary Systems $BaO-TiO_2-SnO_2$ and $BaO-TiO_2-ZrO_2$", by G. H. Jonker & W. Kwestroo, Journal of the American Ceramic Society, vol. 41, No. 10, pp. 390–394.
"Phase Equilibriz in the $TiO_2$-Rich Region of the System $BaO-TiO_2$", by H. M. O'Bryan, Jr. & J. Thomson, Jr., Journal of The American Ceramic Society, vol. 52, No. 12, pp. 522–526.
Akzo Chemie, Ketien Catalyst 1982, pp. 80–84.

*Primary Examiner*—Carl F. Dees
*Attorney, Agent, or Firm*—Parkhurst & Oliff

[57] ABSTRACT

A cracking catalyst composition comprising a zeolitic, crystalline aluminosilicate, a matrix material and a barium titanium oxide. The catalyst composition is particularly suitable for cracking metal-containing hydrocarbon feedstocks.

15 Claims, No Drawings

BARIUM TITANIUM OXIDE-CONTAINING FLUIDIZABLE CRACKING CATALYST COMPOSITION

BACKGROUND OF THE INVENTION

The present invention relates to a fluidizable cracking catalyst composition comprising a zeolitic, crystalline aluminosilicate, a matrix material and a barium compound. A catalyst composition of this type is suitable for cracking oil feedstocks and is disclosed in U.S. Pat. No. 4,473,463. According to the description in that patent, barium compounds are incorporated into or applied onto cracking catalysts to prevent deleterious effects caused by metal contamination in oil feedstocks. The catalysts generally contain a silica-alumina matrix in which zeolitic materials are embedded. Preferably, use is made of barium acetyl acetonate. In this U.S. patent, the results obtained are described in an example in which a cracking catalyst contaminated with metals is re-activated in a treatment with barium acetyl acetonate. This compound, however, and many other barium compounds are not quite suitable to be used for composing a metal resistant cracking catalyst, as appears from metal resistance and micro-activity tests (referred to as MR test and MAT test, respectively).

A barium compound in which the cracking catalyst composition of the above well-known type but which contains a barium titanium oxide has now been found which does not show the above drawback.

Use of barium compounds in cracking catalysts is also known from other patent specifications. U.S. Pat. No. 4,179,409 describes a cracking catalyst which in addition to a zeolite and an inorganic oxide gel matrix contains a perovskite. As a result, the cracked oil will have a higher octane number. The perovskite may be a barium compound, such as barium zirconate ($BaZrO_3$).

In the cracking process of EP No. 0 063 712, use is made of metal traps, such as type A zeolite, which may contain for instance a barium compound. It should be added that U.S. Pat. No. 4,451,355 relates to a cracking catalyst which in addition to a zeolitic aluminosilicate and a matrix material contains a calcium-containing additive for trapping metal contaminations. Particular calcium/titanium-containing compounds, including calcium titanate ($CaTiO_3$), are considered to be particularly suitable for this purpose.

SUMMARY OF THE INVENTION

The present invention provides a cracking catalyst composition comprising a zeolitic, crystalline aluminosilicate, a matrix material and a barium titanium oxide. The catalyst composition is particularly suitable for cracking metal-containing hydrocarbon feedstocks.

DETAILED DESCRIPTION OF THE INVENTION

The barium titanium oxides that may be included in the present catalyst composition are described by, inter alia, D. E. Rase and R. Roy in J. Amer. Ceram. Soc. 38, 108 (1955), G. H. Jonker and W. Kwestroo in J. Amer. Ceram. Soc. 41, 390 (1958) and H. M. O'Bryan and I. Thomson in J. Amer. Ceram. Soc. 57, 522 (1974). Examples of suitable barium titanium oxides include $Ba_2TiO_4$, $BaTiO_3$, $Ba_2Ti_5O_{12}$, $Ba_6Ti_{17}O_{40}$, $BaTi_3O_7$, $Ba_4Ti_{13}O_{30}$, $BaTi_4O_9$ and $Ba_2Ti_9O_{20}$. Particularly suitable are $Ba_2TiO_4$, $BaTi_3O_7$ and especially $BaTiO_3$ (barium titanate).

As the zeolite crystalline aluminosilicate may be used all molecular sieves commonly employed for cracking catalysts. It is preferred that use should be made of synthetic crystalline aluminosilicates having a pore diameter in the range of 3 to 15 angstroms. Examples thereof include the zeolites A, X, Y, ultrastabilized sieves, ZK-4, ZK-5, ZSM-5, ZSM-11 and ZSM-12. It is preferred that zeolites of the types X, Y and/or ultrastabilized sieves should be applied. To ensure proper catalyst activity the cations of these zeolites, which are often prepared in the sodium form, need to be exchanged. For this ion exchange, use is generally made of solutions containing rare earth metal ions and/or ammonium or hydrogen ions. The exchange is as a rule carried on to such a level that the zeolites and the ready catalyst contain less than 4% by weight, preferably less than 0.5% by weight, of sodium.

As matrix material can be used all well-known matrix materials suitable for embedding zeolitic, crystalline aluminosilicates, such as silica, alumina, magnesia, zirconia, titania, boria, aluminum chlorohydrol and mixtures thereof. Preference is given to silica, silica-alumina and alumina.

In addition to the barium titanium oxide and the alumino silicate, other components may also be incorporated into the matrix material. As examples thereof may be mentioned clays such as kaolin, bentonite and layered clays as discussed in U.S. Pat. Nos. 3,252,757, 3,252,889 and 3,743,594, montmorrilonite, etc.

To augment the octane number of the petrol fraction produced, alumina particles as described in U.S. Pat. No. 4,182,693 may be incorporated into the catalyst composition.

Moreover, use may be made of usual amounts of one or more passivators which may contain antimony, tin and the like. They particularly serve to prevent excessive formation of hydrogen during the cracking process.

To reduce $SO_x$ emission and to promote the conversion of CO to $CO_2$, an oxidation promoting metal or metal compound may be incorporated into the present composition. The cracking catalyst composition generally contains 0.05–1000 ppm of an oxidation promoting metal or metal compound. Suitable for that purpose are noble metals or compounds thereof of group VIII of the periodic system, such as Pt, Pd, Ir, Rh, Os and Ru. Also suitable to that end are rare earth metals or compounds thereof. Examples of suitable oxidation promoters also include Cr and Cu, and compounds thereof. It is preferred that use should be made of 0.1 to 100 ppm, more particularly 0.1–50 ppm of a noble metal of group VIII. Most preference is given to the incorporation into the catalyst of 0.1–10 ppm of platinum or palladium. These metals may be incorporated in the catalyst in a known manner, for instance by impregnation with a corresponding salt solution.

The components of the catalyst composition may be combined with the matrix material in a manner known in itself. Suitable methods of preparation are described, among other places, in U.S. Pat. Nos. 3,609,103 and 3,676,330. For instance, the barium titanium oxide and the aluminosilicate may be combined with the matrix material when the latter material is already in the gelled state. After proper mixing and subsequent spray drying the ready catalyst composition is obtained. Alternatively, the various components may be added to a matrix material in the form of a sol. This sol bonding agent can be formed into a gel before or during spray drying.

The latter procedure is to be preferred in that it permits obtaining catalyst compositions having a relatively high density. Thus, apparent densities higher than 0.5 g/ml, preferably higher than 0.70 g/ml are simple to realize.

A suitable catalyst composition according to the present invention comprises 5-50, preferably 10-30 percent by weight of a zeolitic, crystalline aluminosilicate and 0.01-30, preferably 1-20, more particularly 1-10 percent by weight of barium titanium oxide, which two components are embedded in 10-90 percent by weight of matrix material. It is preferred that the aluminosilicate should consist of a type Y zeolite or an ultrastabilized zeolite exchanged for rare earth metal ions and/or ammonium or hydrogen ions. The matrix material is preferably a silica, silica-alumina or alumina formed into a gel by spray drying the total composition. Particularly in uses requiring a reduction of $SO_x$ emission, it is preferred that there should be incorporated 0.1-10 ppm of platinum into the catalyst composition.

The cracking catalyst composition may optionally consist of a physical mixture of:

a. catalytically active particles comprising a zeolitic crystalline aluminosilicate embedded in matrix material; and b. catalytically less active particles comprising barium titanium oxide embedded in matrix material. This embodiment of the invention has the advantage that the amount of barium titanium oxide added can readily be adapted to the feedstock to be cracked.

Very suitable is a physical mixture in which:

a. the catalytically active particles contain 10-80, preferably 20-40 percent by weight of zeolitic, crystalline aluminosilicate, 5-60, preferably 20-50 percent by weight of clay and 5-85, preferably 10-30 percent by weight of silica, silica-alumina or alumina, and b. the catalytically less active particles contain 10-80, preferably 10-40 percent by weight of barium titanium oxide, and 10-90, preferably 10-30 percent by weight of silica, silica-alumina, or alumina and, optionally, 10-50 percent by weight of clay.

Also in this mixture the silica, silica-alumina or alumina in the catalytically active and/or less active particles perferably consists of silica, silica-alumina or alumina formed into a gel by spray drying the respective particles. Especially if augmentation of the octane number of petrol fractions is envisaged, then aluminum oxide particles may be incorporated into the catalytically active and/or less active particles in an amount of up to in all 40, preferably 1-15 percent by weight of aluminum oxide particles.

It is also possible for the two different types of particles to have different diameters. For instance, the catalytically active paticles may have a diameter of 80-125 microns and the catalytically less active particles a diameter of 30-75 microns.

Moreover, into one or more of the two components of the mixture a noble metal of group VIII of the periodic system may be incorporated in a concentration of 0.1-100 ppm, preferably 0.1 to 50 ppm, calculated on the weight of the total mixture. It is again preferred then that platinum should be used in an amount of 0.1-10 ppm.

The present catalyst composition is suitable for use in a conventional process for cracking feeds. Catalytic cracking is normally carried out at a temperature of 375°-650° C., more particularly 460°-560° C. The pressure applied is generally in the range from atmospheric pressure to a pressure of 7 atmospheres, more particularly a pressure from 1 to 3 atmospheres. Regeneration with steam is generally carried out at 540°-825°, more particularly 750°-800° C. Suitable feeds include the hydrocarbon materials that are normally subjected to cracking.

The catalyst composition is particularly suitable for cracking metal-containing hydrocarbon feedstocks having a boiling range which generally ends at a temperature higher than 480° C., a density greater than 900 kg/cm$^3$, metal concentration (Ni and V) of more than 1 ppm and a Conradson carbon content higher than 1%. The present catalyst composition, however, is preferably applied to heavier feeds, such as residues that include a substantial concentration of metals and/or asphaltenes.

If the feedstock has a high metal content, preference is given to a process in which the feedstock to be cracked is first brought into contact with the barium titanium oxide-containing particles and subsequently with the zeolite-containing particles. The feedstock will be demetallized then before cracking.

EXAMPLE 1

The catalyst compositions in Table 1 were obtained by mixing the various catalyst constituents with a silica-alumina sol. The total compositions were milled in a colloid mill, gelled by spray drying, and the resulting particles were exchanged with $(NH_4)_2SO_4$, and dried. The performance of the resulting catalyst compositions was measured by carrying out MAT and MR tests. The MAT test corresponds to test method D3907-80 of the American Society for Testing and Materials (ASTM). The MR test is described on pp. 80-84 of the Ketjen Symposium book, 1982, Amsterdam, The Netherlands.

The MAT and MR tests are used for determining the activity of the cracking catalyst prior to (MAT test) and after (MR test) contamination of the catalyst with metals (nickel and vanadium). The higher the rate constant k and the conversion, the more active the catalyst will be. The results mentioned in Table 2 illustrate the extraordinary effectiveness of catalysts containing a barium titanium oxide, in particular barium titanate.

The results also show that the amount of barium titanium oxide in the total catalyst composition can be varied within wide limits. For comparison, the table gives the test results obtained with additives that are known from the state of the art discussed hereinbefore.

TABLE 1

| | Catalyst Composition and Properties | | | | | | | | |
|---|---|---|---|---|---|---|---|---|---|
| | BaTiO$_3$ | | | | BaTi$_3$O$_7$ | BaAcAc* | BaCO$_3$ | BaZrO$_3$ | CaTiO$_3$ |
| | 2.5% | 5% | 10% | 20% | 8.5% | 10% | 20% | 20% | 20% |
| REHN$_4$Y-zeolite (%; SiO$_2$/Al$_2$O$_3$ = 5) | 15 | 15 | 15 | 15 | 15 | 15 | 15 | 15 | 15 |
| Silica-alumina 97%/3% | 20 | 20 | 20 | 20 | 20 | 20 | 20 | 20 | 20 |
| Kaolin (%) | 62.5 | 60 | 55 | 45 | 56.5 | 55 | 45 | 45 | 45 |
| Na$_2$O (%) | 0.23 | 0.28 | 0.28 | 0.26 | 0.26 | 0.24 | 0.25 | 0.23 | 0.24 |

TABLE 1-continued

| | Catalyst Composition and Properties | | | | | | | | |
|---|---|---|---|---|---|---|---|---|---|
| | BaTiO$_3$ | | | | BaTi$_3$O$_7$ | BaAcAc* | BaCO$_3$ | BaZrO$_3$ | CaTiO$_3$ |
| | 2.5% | 5% | 10% | 20% | 8.5% | 10% | 20% | 20% | 20% |
| RE$_2$O$_3$ (%) | 1.7 | 2.0 | 1.9 | 2.0 | 1.8 | 2.0 | 2.0 | 1.7 | 2.0 |
| SA (m$^2$/g; fresh) | 113 | 136 | 116 | 99 | 124 | 144 | 106 | 114 | 89 |
| SA (m$^2$/g; 795° C.) | 54 | 58 | 52 | 45 | 48 | 39 | 30 | — | 28 |
| ABD (g/ml) | 0.70 | 0.72 | 0.76 | 0.80 | — | 0.56 | 0.80 | — | 0.78 |

% = weight percentage
*Barium acetyl acetonate

TABLE 2

| | Test Results | | | | | | | | |
|---|---|---|---|---|---|---|---|---|---|
| | BaTiO$_3$ | | | | BaTi$_3$O$_7$ | BaAcAc | BaCO$_3$ | BaZrO$_3$ | CaTiO$_3$ |
| | 2.5% | 5% | 10% | 20% | 8.5% | 10% | 20% | 20% | 20% |
| MAT - 795° C.-Test: | | | | | | | | | |
| k | 16.9 | 17.2 | 16.1 | 15.0 | 15.2 | 13.2 | 10.2 | 11.6 | 9.4 |
| Conversion % | 58.5 | 58.7 | 57.0 | 55.3 | 55.7 | 52.2 | 46.0 | 49.2 | 44.0 |
| Gas total % | 11.2 | 10.9 | 10.5 | 10.3 | 10.9 | 9.2 | 8.4 | 8.5 | 7.5 |
| Gasoline % | 44.8 | 45.2 | 44.2 | 42.6 | 42.6 | 41.0 | 35.7 | 39.0 | 35.1 |
| LCO % | 23.6 | 23.6 | 23.3 | 23.8 | 23.7 | 23.3 | 24.4 | 23.3 | 23.4 |
| Coke % | 2.5 | 2.6 | 2.4 | 2.3 | 2.3 | 2.0 | 1.9 | 1.7 | 1.4 |
| MR-Test: | | | | | | | | | |
| V (ppm) | 3158 | 3201 | 3324 | 2971 | 3120 | 3238 | 3076 | 3270 | 3257 |
| Ni (ppm) | 982 | 1026 | 995 | 998 | 1085 | 1007 | 1016 | 954 | 860 |
| k | 19.8 | 24.2 | 22.2 | 21.5 | 18.4 | 9.6 | 20.4 | 17.1 | 14.9 |
| Conversion % | 62.1 | 66.7 | 64.7 | 64.2 | 60.4 | 44.1 | 62.8 | 58.8 | 55.1 |
| Gas total % | 12.6 | 13.6 | 13.6 | 13.7 | 12.4 | 7.0 | 11.9 | 12.7 | 10.4 |
| Gasoline % | 45.4 | 48.1 | 46.1 | 46.1 | 44.6 | 34.2 | 46.7 | 42.6 | 41.6 |
| LCO % | 22.5 | 20.6 | 21.3 | 21.6 | 22.2 | 25.1 | 21.0 | 21.7 | 23.2 |
| Coke % | 4.1 | 5.0 | 5.0 | 4.4 | 3.6 | 3.0 | 4.3 | 3.6 | 3.2 |
| H$_2$ | 0.13 | 0.12 | 0.13 | 0.12 | 0.15 | 0.24 | 0.14 | 0.09 | 0.16 |

EXAMPLE 2

Using the procedure described in Example 1, catalysts A and B were prepared that contain an ultrastable Y-zeolite and are further characterized by the composition and properties mentioned in the table below.

TABLE III

| Catalyst Composition and Properties | | |
|---|---|---|
| | Catalyst A | Catalyst B |
| Ultrastable Y-zeolite (a$_⊕$ = 24.53 Angstroms) | 25 | 25 |
| Kaolin (%) | 55 | 35 |
| Silica (%) | 20 | 20 |
| BaTiO$_3$ (%) | 0 | 20 |
| RE$_2$O$_3$ (%) | 0 | 0 |
| Na$_2$O (%) | 0.16 | 0.28 |
| SA (m$^2$/g; fresh) | 232 | 259 |
| SA (m$^2$/g; 795° C.) | 132 | 129 |

The test results in the following Table IV show the excellent resistance to metal (see MR test) of catalyst B, which contains barium titanate.

TABLE IV

| | Test Results | |
|---|---|---|
| | Catalyst A | Catalyst B |
| MAT-795° C.-Test: | | |
| k | 12.8 | 13.3 |
| Conversion | 51.7 | 52.2 |
| Gas total (%) | 11.7 | 11.3 |
| Gasoline (%) | 38.4 | 39.6 |
| LCO (%) | 24.9 | 24.8 |
| Coke (%) | 1.6 | 1.7 |
| MR-Test: | | |
| V (ppm) | 3350 | 3132 |
| Ni (ppm) | 1225 | 1045 |
| k | 5.7 | 15.8 |
| Conversion (%) | 32.3 | 56.9 |
| Gas total (%) | 5.8 | 13.2 |
| Gasoline (%) | 23.7 | 40.8 |
| LCO (%) | 26.6 | 24.2 |
| Coke (%) | 2.9 | 2.9 |
| H$_2$ (%) | 0.65 | 0.36 |

EXAMPLE 3

Using the procedure described in Example 1, the following Y-zeolite-containing "active" and barium titanate-containing "less active" catalyst particles were prepared.

TABLE V

| | Catalyst Composition | |
|---|---|---|
| | Active Particles | Less Active Particles |
| RENH$_4$—Y-zeolite (%) | 30 | 0 |
| Kaolin (%) | 50 | 70 |
| Silica (%) | 20 | 20 |
| BaTiO$_3$ (%) | 0 | 10 |

Then a mixture was prepared of equal amounts by weight of the two types of particles. The mixture contained 1.6 RE$_2$O$_3$, 0.25% Na$_2$O and had an SA=109 m$^2$/g. The MAT and MR test results show the effectiveness of this cracking catalyst mixture.

TABLE VI

| | Test Results |
|---|---|
| MAT - 795° C. - Test | |
| k | 16.6 |
| Conversion (%) | 57.9 |
| Gas total (%) | 10.9 |
| Gasoline (%) | 44.4 |

TABLE VI-continued

| Test Results | |
| --- | --- |
| LCO (%) | 23.1 |
| Coke (%) | 2.6 |
| MR-Test | |
| V (ppm) | 3230 |
| Ni (ppm) | 935 |
| k | 16.7 |
| Conversion (%) | 58.2 |
| Gas total (%) | 11.8 |
| Gasoline (%) | 42.5 |
| LCO (%) | 22.8 |
| Coke (%) | 3.8 |
| $H_2$ (%) | 0.19 |

What is claimed is:

1. A fluidizable cracking catalyst comprising a zeolitic, crystalline aluminosilicate, a matrix material and a barium titanium oxide.

2. A catalyst according to claim 1, wherein said barium titanium oxide and said zeolitic, crystalline aluminosilicate are collectively incorporated in a matrix comprising said matrix material.

3. A catalyst according to claim 1, comprising 1 to 20 percent by weight of said barium titanium oxide.

4. A catalyst according to claim 1, comprising 1 to 10 percent by weight of said barium titanium oxide.

5. A catalyst according to claim 4, comprising 10 to 30 percent by weight of said zeolitic, crystalline aluminosilicate.

6. A catalyst according to claim 5, wherein said barium titanium oxide and said zeolitic, crystalline aluminosilicate are embedded in 10 to 90 percent by weight of said matrix material.

7. A catalyst according to claim 1, wherein said barium titanium oxide is physically separated from said zeolitic, crystalline aluminosilicate, said catalyst comprising:
   a. catalytically active particles comprising said zeolitic, crystalline aluminosilicate embedded in said matrix material, and
   b. catalytically less active particles comprising said barium titanium oxide embedded in said matrix material.

8. A catalyst according to claim 7, wherein said catalytically less active particles contain 10 to 40 percent by weight of barium titanium oxide.

9. A catalyst according to claim 8, wherein said catalytically active particles contain 20 to 40 percent by weight of said zeolitic, crystalline aluminosilicate.

10. A catalyst according to claim 1, wherein said barium titanium oxide is barium titanate.

11. A catalyst according to claim 1, further comprising a clay.

12. A catalyst according to claim 1, further comprising a passivator.

13. A catalyst according to claim 1, further comprising an oxidation promoting metal or metal compound.

14. Particles comprising barium titanium oxide embedded in a matrix material.

15. Particles according to claim 14, wherein said barium titanium oxide is barium titanate.

* * * * *

UNITED STATES PATENT AND TRADEMARK OFFICE
CERTIFICATE OF CORRECTION

PATENT NO. : 4,791,085

DATED : December 13, 1988

INVENTOR(S) : Cornelis J. Groenenboom

It is certified that error appears in the above-identified patent and that said Letters Patent is hereby corrected as shown below:

Column 5, fourth line of "TABLE III", change "$(a_{\oplus}$" to --$(a_o$--

Signed and Sealed this

Fifteenth Day of August, 1989

Attest:

DONALD J. QUIGG

*Attesting Officer*    *Commissioner of Patents and Trademarks*